(12) United States Patent
Kato

(10) Patent No.: US 9,576,744 B2
(45) Date of Patent: Feb. 21, 2017

(54) SOLID ELECTROLYTIC CAPACITOR

(71) Applicant: Panasonic Intellectual Property Management Co., Ltd., Osaka (JP)

(72) Inventor: Toshiyuki Kato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 14/617,031

(22) Filed: Feb. 9, 2015

(65) Prior Publication Data
US 2015/0155103 A1    Jun. 4, 2015

Related U.S. Application Data

(63) Continuation of application No. PCT/JP2013/005011, filed on Aug. 26, 2013.

(30) Foreign Application Priority Data

Aug. 29, 2012 (JP) ................................. 2012-188632

(51) Int. Cl.
*H01G 9/08* (2006.01)
*H01G 9/052* (2006.01)
(Continued)

(52) U.S. Cl.
CPC .............. *H01G 9/052* (2013.01); *H01G 9/012* (2013.01); *H01G 9/10* (2013.01); *H01G 9/15* (2013.01); *H01G 9/08* (2013.01)

(58) Field of Classification Search
None
See application file for complete search history.

(56) References Cited

U.S. PATENT DOCUMENTS 7,778,011 B2 * 8/2010 Fujii ........................ H01G 2/06
                                                361/519
9,039,787 B2 * 5/2015 Fujii .................... H01G 9/0036
                                                29/25.03
(Continued)

FOREIGN PATENT DOCUMENTS

JP       4-042520       2/1992
JP    2004-014667       1/2004
(Continued)

OTHER PUBLICATIONS

International Search Report of PCT application No. PCT/JP2013/005011 dated Sep. 17, 2013.

*Primary Examiner* — Dion R Ferguson
(74) *Attorney, Agent, or Firm* — McDermott Will & Emery LLP

(57) ABSTRACT

A solid electrolytic capacitor comprising a capacitor element including a positive electrode which contains tantalum as a principal component and is composed of a porous sintered body, a positive electrode lead which contains niobium as a principal component and has a first end part embedded in the positive electrode and a second end part extending from the positive electrode, a dielectric layer which is disposed on a surface of the positive electrode and a part of a surface of the positive electrode lead, and a negative electrode layer disposed on the dielectric layer; an positive electrode terminal electrically connected to the second end part of the positive electrode lead; a negative electrode terminal electrically connected to the negative electrode layer; and a resin outer body covering the surfaces of the capacitor element, a part of the positive electrode terminal and a part of the negative electrode terminal, wherein a linear expansion coefficient of the resin outer body is larger than all of linear expansion coefficients of the positive electrode, the positive electrode (Continued)

lead, the positive electrode terminal, and the negative electrode terminal.

4 Claims, 1 Drawing Sheet

(51) Int. Cl.
*H01G 9/012* (2006.01)
*H01G 9/10* (2006.01)
*H01G 9/15* (2006.01)

(56) References Cited

U.S. PATENT DOCUMENTS

| | | | | |
|---|---|---|---|---|
| 2009/0159323 A1* | 6/2009 | Ota | ............... | H01B 1/24 174/260 |
| 2009/0161299 A1* | 6/2009 | Nemoto | ............... | H01G 9/0425 361/532 |
| 2009/0231782 A1* | 9/2009 | Fujita | ............... | C25D 7/00 361/525 |
| 2010/0024182 A1* | 2/2010 | Shimamoto | ............... | H01G 9/028 29/25.42 |
| 2010/0246100 A1* | 9/2010 | Umemoto | ............... | H01G 9/012 361/535 |
| 2010/0302711 A1* | 12/2010 | Kaneda | ............... | C25D 11/26 361/524 |
| 2013/0222977 A1* | 8/2013 | Kawahito | ............... | H01G 9/028 361/523 |
| 2015/0213961 A1* | 7/2015 | Liu | ............... | H01G 9/012 361/529 |

FOREIGN PATENT DOCUMENTS

| | | |
|---|---|---|
| JP | 2005-072399 | 3/2005 |
| JP | 2009-182157 | 8/2009 |
| JP | 2010-109284 | 5/2010 |

* cited by examiner

SOLID ELECTROLYTIC CAPACITOR

RELATED APPLICATIONS

This application is a Continuation of International Application No. PCT/JP2013/005011, filed on Aug. 26, 2013, which in turn claims priority from Japanese Patent Application No. 2012-188632, filed on Aug. 29, 2012, the contents of all of which are incorporated herein by reference in their entireties.

TECHNICAL FIELD

The present disclosure relates to a solid electrolytic capacitor.

BACKGROUND

Recently, as electronic equipment has been reduced in size, small-sized high-frequency capacitors having large capacitance have been demanded. As such capacitors, a solid electrolytic capacitor using a solid electrolyte layer made of a conductive polymer has been proposed, which comprises a positive electrode, a dielectric layer, and the solid electrolyte layer that is formed on the dielectric layer. In the solid electrolytic capacitor, the positive electrode is composed of a sintered body of valve metal such as tantalum, niobium, titanium, and aluminum, and then the dielectric layer is formed by anodizing a surface of the positive electrode.

A positive electrode lead connecting to the positive electrode terminal is disposed in the positive electrode. In Unexamined Japanese Patent Publication No. 4-42520, a technology which uses a positive electrode lead made of niobium and the like, which is a valve metal different from tantalum, applying for a positive electrode made of tantalum is proposed in order to enhance adhesion between the positive electrode and the positive electrode lead.

SUMMARY

The solid electrolytic capacitor comprises a capacitor element including a positive electrode which contains tantalum as a principal component and is composed of a porous sintered body, a positive electrode lead which contains niobium as a principal component and has a first end part embedded in the positive electrode and a second end part extending from the positive electrode, a dielectric layer which is disposed on a surface of the positive electrode and a part of a surface of the positive electrode lead, and a negative electrode layer disposed on the dielectric layer; a positive electrode terminal electrically connected to the second end part of the positive electrode lead; a negative electrode terminal electrically connected to the negative electrode layer; and a resin outer body covering the surfaces of the capacitor element, a part of the positive electrode terminal and a part of the negative electrode terminal, wherein a linear expansion coefficient of the resin outer body is larger than all of linear expansion coefficients of the positive electrode, the positive electrode lead, the positive electrode terminal, and the negative electrode terminal.

DESCRIPTION OF EMBODIMENTS

Figure 1:
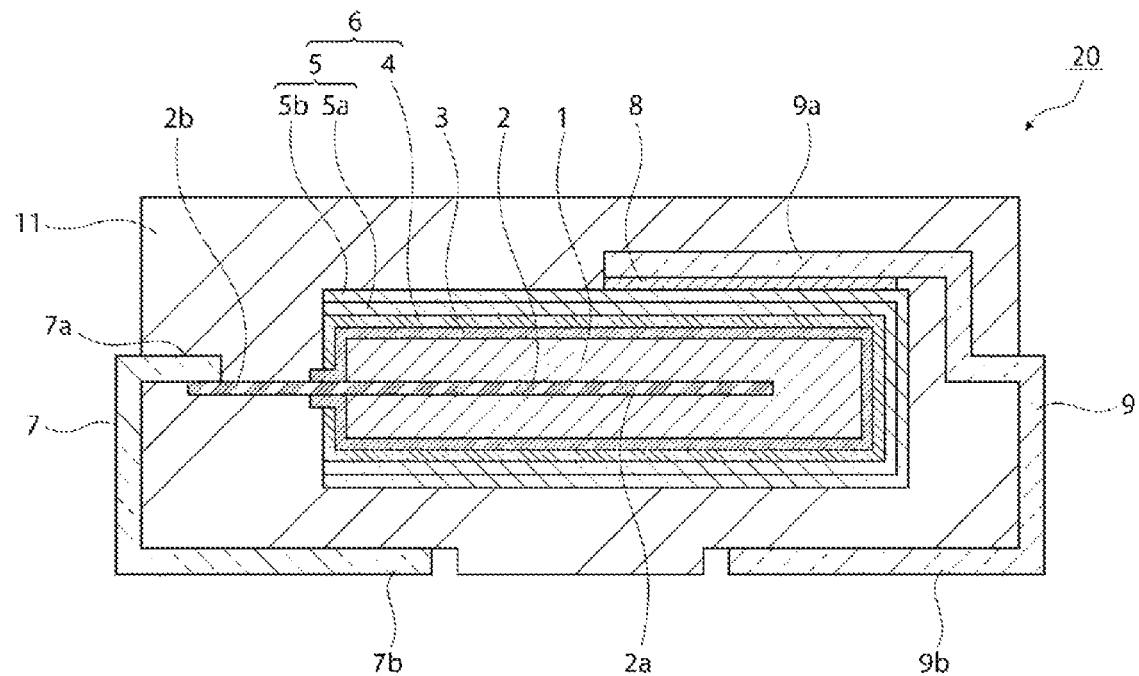
FIG. 1 is a schematic sectional view of a solid electrolytic capacitor in an exemplary embodiment.

First, problems intend to solve are described as follows.

When a principal component of the valve metal constituting the positive electrode is different from a principal component of the valve metal constituting the positive electrode lead, adhesion between the positive electrode and the positive electrode lead may be deteriorated and equivalent series resistance (ESR) of the solid electrolytic capacitor may be increased because load of high temperature is applied to the solid electrolytic capacitor due to reflow process for soldering the solid electrolytic capacitor or the like.

The present disclosure provides a solid electrolytic capacitor which can suppress an increase in ESR after a high-temperature load in the solid electrolytic capacitor using the positive electrode containing tantalum as a principal component and the positive electrode lead containing niobium as a principal component.

In the present disclosure, the linear expansion coefficient of the resin outer body is larger than all of the linear expansion coefficients of the positive electrode, the positive electrode lead, the positive electrode terminal and the negative electrode terminal. The difference between the linear expansion coefficient of the resin outer body and the largest one of the linear expansion coefficients of the positive electrode, the positive electrode lead, the positive electrode terminal and the negative electrode terminal is preferably $0.05 \times 10^{-5}/°C$. If the difference is larger, it is possible to enhance the effect of suppressing an increase in ESR after a high-temperature load.

In the present disclosure, since the linear expansion coefficient of the resin outer body is larger than all of linear expansion coefficients of the positive electrode, the positive electrode lead, the positive electrode terminal and the negative electrode terminal, stress is exerted so as to enhance adhesion at an interface between the positive electrode and the positive electrode lead, an interface between the positive electrode terminal and the positive electrode lead, and an interface between the negative electrode terminal and the conductive adhesive (negative electrode layer) when a load of high temperature is applied to the solid electrolytic capacitor. Therefore, after the high-temperature load, adhesion between the positive electrode and the positive electrode lead, adhesion between the positive electrode terminal and the positive electrode lead, and adhesion between the negative electrode terminal and the conductive adhesive (negative electrode layer) can be enhanced.

An upper limit value of the difference between the linear expansion coefficient of the resin outer body and the largest one of the linear expansion coefficients of the positive electrode, the positive electrode lead, the positive electrode terminal and the negative electrode terminal and is not particularly limited; however, it is usually $1.5 \times 10^{-5}/°C$. or less.

When the positive electrode terminal and the negative electrode terminal are made of copper or each of these terminals has a core made of copper, the linear expansion coefficient of the resin outer body preferably is within a range from $1.7 \times 10^{-5}$ to $3.0 \times 10^{-5}/°C$. When the linear expansion coefficient of the resin outer body is smaller than the linear expansion coefficient within this range, the increase in ESR after a high-temperature load may not be adequately suppressed. Further, when the linear expansion coefficient of the resin outer body is larger than the linear expansion coefficient within this range, after the high-temperature load, stress may be excessively added to the interior of the solid electrolytic capacitor and a leakage current may increase.

When the linear expansion coefficient of the resin outer body is smaller than those of the positive electrode containing tantalum as a principal component and the positive electrode lead containing niobium as a principal component, since an elastic modulus of the resin outer body increases and the resin outer body becomes too hard, after the high-temperature load, stress may be excessively added to the interior of the solid electrolytic capacitor and a leakage current may significantly increase.

Hereinafter, one example of a preferred exemplary embodiment of the present disclosure is described. However, the following exemplary embodiment is just an exemplification. The present disclosure is not limited to the following exemplary embodiment at all.

Further, in drawings referred to in exemplary embodiments, members having a substantially the same function are denoted by the same symbols for reference. Further, the drawings referred to in exemplary embodiments are schematically described. Scales of dimensions of an object drawn in the drawing may be different from those of an actual object. Scales of dimensions of objects between drawings may also be different. Specific scales of dimensions of the objects should be determined in consideration of the following description.

FIG. 1 is a schematic sectional view showing an interior of a solid electrolytic capacitor in the present exemplary embodiment.

Solid electrolytic capacitor 20 in the present exemplary embodiment has an outside shape of rectangular parallelepiped. As shown in FIG. 1, solid electrolytic capacitor 20 comprises a capacitor element composed of positive electrode 1, positive electrode lead 2, dielectric layer 3 and negative electrode layer 6; positive electrode terminal 7; negative electrode terminal 9; and resin outer body 11. Hereinafter, these are described.

As described above, the capacitor element includes positive electrode 1 made of a valve metal, positive electrode lead 2 disposed such that first end part 2a is embedded in positive electrode 1 and second end part 2b extends from positive electrode 1, dielectric layer 3 formed by anodizing positive electrode 1, and negative electrode layer 6 covering dielectric layer 3.

Positive electrode 1 is composed of a porous body formed by forming and sintering many metal particles made of a valve metal or an alloy of the valve metal. A principal component of positive electrode 1 is tantalum (Ta), and positive electrode 1 is formed of tantalum or an alloy containing tantalum as a principal component. Herein, the "principal component" means the component contained in an amount of 90% by mass or more. Positive electrode 1 may include components other than tantalum such as silicon, vanadium, boron, nitrogen and the like. The linear expansion coefficient of tantalum is $6.7 \times 10^{-6}/^\circ$ C.

Positive electrode lead 2 having first end part 2a embedded in positive electrode 1 is joined to positive electrode 1.

Positive electrode lead 2 contains niobium as a principal component. Accordingly, positive electrode lead 2 can be formed of niobium or an alloy containing niobium as a principal component. Herein, the "principal component" means the component contained in an amount of 90% by mass or more. Positive electrode lead 2 may include components other than niobium such as silicon, vanadium, boron, nitrogen and the like. The linear expansion coefficient of niobium is $7.3 \times 10^{-6}/^\circ$ C.

Dielectric layer 3 can be formed so as to cover the surface of positive electrode 1 by anodizing positive electrode 1. Though dielectric layer 3 is described as an oxide film formed on an outer surface of positive electrode 1 in FIG. 1, in fact, dielectric layer 3 is also formed on wall surfaces of pores in the porous body because positive electrode 1 is a porous body as described above.

Figure 2:
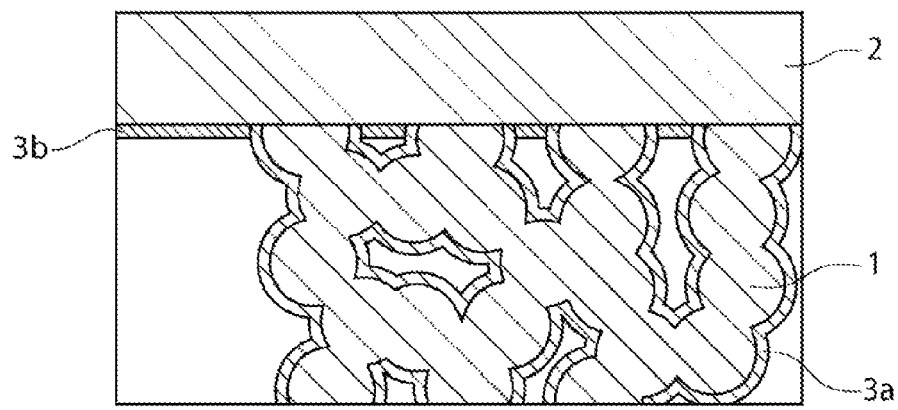
FIG. 2 is a schematic sectional view showing an enlarged vicinity of an interface between an positive electrode and an positive electrode lead in the solid electrolytic capacitor shown in FIG. 1.

FIG. 2 is a schematic sectional view showing an enlarged vicinity of an interface between positive electrode lead 2 and positive electrode 1. As shown in FIG. 2, dielectric layer 3b is also formed on a part of the surface of positive electrode lead 2. In FIG. 2, dielectric layer 3 to be formed on the surface of positive electrode 1 is shown as dielectric layer 3a.

Conductive polymer layer 4 is formed so as to cover dielectric layer 3. A chemical polymerization method or an electropolymerization method can be used for forming conductive polymer layer 4. Conductive polymer layer 4 may have a single layer, or may have a plurality of layers. Examples of a conductive polymer material for conductive polymer layer 4 are polypyrrole, polythiophene, polyaniline and polyfuran. In the present exemplary embodiment, conductive polymer layer 4 is used as a solid electrolytic layer; however, a layer made of manganese dioxide or the like can be used instead of conductive polymer layer 4.

Though conductive polymer layer 4 is described as a layer on dielectric layer 3 formed on an outer surface of positive electrode 1 in FIG. 1, conductive polymer layer 4 is also formed on the surface of dielectric layer 3 formed on wall surfaces of pores in the porous body.

Negative electrode draw out layer 5 is formed so as to partially cover conductive polymer layer 4, and has a layered structure in which carbon layer 5a and silver paste layer 5b are formed successively. Carbon layer 5a is a layer containing carbon particles. Silver paste layer 5b formed on carbon layer 5a is a layer containing silver particles. Negative electrode draw out layer 5 may be only one layer selected from the carbon layer and the silver paste layer. Negative electrode draw out layer 5 may have a layer having a current-collecting function.

Negative electrode layer 6 comprises conductive polymer layer 4 and negative electrode draw out layer 5. Negative electrode layer 6 may be a layer functioning as a negative electrode.

Positive electrode terminal 7 is attached to positive electrode lead 2. Specifically, this positive electrode terminal 7 is formed by bending a band-shaped metal plate, as shown in FIG. 1, first end part 7a of positive electrode terminal 7 on the under surface thereof is mechanically and electrically connected to the second end part 2b of positive electrode lead 2 by welding or the like.

Negative electrode terminal 9 is attached to negative electrode layer 6. Specifically, this negative electrode terminal 9 is formed by bending a band-shaped metal plate, as shown in FIG. 1, first end part 9a of negative electrode terminal 9 on the under surface thereof is bonded to negative electrode layer 6 by conductive adhesive 8, and thereby negative electrode terminal 9 is mechanically and electrically connected to negative electrode layer 6. Specific examples of conductive adhesive 8 are materials such as a silver paste obtained by mixing silver particles with an epoxy resin.

Examples of the materials for positive electrode terminal 7 and negative electrode terminal 9 are copper, a copper alloy and an iron-nickel alloy (alloy 42). The linear expansion coefficient of copper is $1.62 \times 10^{-5}/°$ C. and the linear expansion coefficient of alloy 42 is $0.46 \times 10^{-5}/°$ C.

Resin outer body 11 is formed so as to cover exposed surfaces of positive electrode lead 2, negative electrode layer 6, positive electrode terminal 7, and negative electrode terminal 9. Second end part 7b of positive electrode terminal 7 and second end part 9b of negative electrode terminal 9 are exposed from resin outer body 11 in an area from a side surface to an under surface thereof, and the exposed portions of positive electrode terminal 7 and negative electrode terminal 9 are used for solder joint to a substrate.

As a material of resin outer body 11, a material functioning as a sealing material is used, and specific examples of the material are an epoxy resin, a silicone resin and the like.

The linear expansion coefficient of resin outer body 11 is larger than the linear expansion coefficients of positive electrode 1, positive electrode lead 2, positive electrode terminal 7 and negative electrode terminal 9. When a terminal made of copper or a terminal having a core made of copper is used as positive electrode terminal 7 and negative electrode terminal 9, the linear expansion coefficients of these terminals are nearly similar to that of copper. Accordingly, the linear expansion coefficient of the terminal is $1.62 \times 10^{-5}/°$ C. In the present exemplary embodiment, the linear expansion coefficients of positive electrode terminal 7 and negative electrode terminal 9 are larger than the linear expansion coefficients of positive electrode 1 and positive electrode lead 2. Accordingly, in the above case, it is preferred to use, as the material of the resin outer body 11, a material having a linear expansion coefficient within a range from $1.7 \times 10^{-5}$ to $3.0 \times 10^{-5}/°$ C.

The linear expansion coefficient of resin outer body 11 can be adjusted by appropriately compounding a main material, a curing agent and a filler. For example, the linear expansion coefficient of resin outer body 11 can be decreased by compounding a filler of a low stress agent such as silica. Examples of the low stress agent other than silica are silicone-based polymer compounds.

When resin outer body 11 is composed of a plurality of members having different linear expansion coefficients, the linear expansion coefficient of resin outer body 11 can be determined from a volume ratio of each member and a linear expansion coefficient of each member.

The linear expansion coefficient can be measured by TMA (Thermal Mechanical Analysis).

In the present exemplary embodiment, the linear expansion coefficient of resin outer body 11 is larger than the linear expansion coefficient of each of positive electrode 1 containing tantalum as a principal component, positive electrode lead 2 containing niobium as a principal component, positive electrode terminal 7 having a core made of copper, and negative electrode terminal 9 having a core made of copper. Therefore, when the solid electrolytic capacitor is loaded with high temperature by reflow or the like, resin outer body 11 can add the stress that enhances adhesion between positive electrode 1 and positive electrode lead 2 at an interface therebetween within resin outer body 11. Accordingly, the adhesion between positive electrode 1 and positive electrode lead 2 can be improved after being loaded with high temperature by reflow or the like.

Moreover, since the linear expansion coefficient of resin outer body 11 is larger than both of the linear expansion coefficients of positive electrode terminal 7 and positive electrode lead 2, the adhesion between positive electrode terminal 7 and positive electrode lead 2 can also be enhanced.

Moreover, since the linear expansion coefficient of resin outer body 11 is larger than the linear expansion coefficient of negative electrode terminal 9, the adhesion between negative electrode terminal 9 and conductive adhesive 8 can be enhanced.

Further, when the solid electrolytic capacitor is loaded with high temperature by reflow or the like, resin outer body 11 can enhance the adhesion between positive electrode 1 and positive electrode lead 2 at an interface therebetween. Therefore, after the solid electrolytic capacitor is loaded with high temperature by reflow or the like, it is possible to suppress the generation of cracks in dielectric layer 3 around an interface between positive electrode 1 and positive electrode lead 2. Accordingly, an increase of a leakage current can be suppressed.

EXAMPLES

Hereinafter, the present disclosure will be described in more detail by way of Examples, but the present disclosure is not intended to be limited to the following examples.

Example 1

Step 1: Formation of Positive Electrode

Positive electrode 1 was prepared by using tantalum metal particles whose primary particle diameter was about 0.5 μm and secondary particle diameter was about 100 μm. Specifically, positive electrode 1 composed of a porous sintered body was formed by forming a plurality of tantalum metal particles and sintering the metal particles in a vacuum in a state in which first end part 2a of positive electrode lead 2 is embedded in positive electrode 1. Positive electrode lead 2 was made of niobium. Second end part 2b of positive electrode lead 2 was fixed in the form of being extended from one surface of positive electrode 1. An outer shape of positive electrode 1 composed of the porous sintered body is a rectangular parallelepiped of 4.4 mm long, 3.3 mm wide and 1.0 mm thick.

The linear expansion coefficient of positive electrode 1 made of tantalum was $6.7 \times 10^{-6}/°$ C. The linear expansion coefficient of positive electrode lead 2 made of niobium was $7.3 \times 10^{-6}/°$ C.

Step 2: Formation of Dielectric Layer

Second end part 2b of positive electrode lead 2 was connected to a positive electrode of an anodization tank, and positive electrode 1 and a part of positive electrode lead 2 were immersed in the anodization tank containing 0.01% by mass to 0.1% by mass phosphoric acid aqueous solution serving as an electrolytic aqueous solution to perform anodizing. Thereby, as shown in FIG. 2, dielectric layer 3a of tantalum oxide ($Ta_2O_5$) was formed on the surface of positive electrode 1, and dielectric layer 3b of niobium oxide ($Nb_2O_5$) was formed on a part of the surface of positive electrode lead 2.

By the anodization step, dielectric layer 3 was formed on an outer surface being the surface of positive electrode 1 composed of a porous sintered body, wall surfaces of pores of positive electrode 1 and a part of the surface of positive electrode lead 2.

The electrolytic aqueous solution is not limited to the phosphoric acid aqueous solution, and nitric acid, acetic acid or sulfuric acid can be used as the electrolytic aqueous solution.

Step 3: Formation of Conductive Polymer Layer

Conductive polymer layer 4 was formed on the surface of dielectric layer 3. In a method of forming conductive polymer layer 4, for example, a precoat layer composed of a conductive polymer such as polypyrrole is first formed by using a chemical polymerization method. Subsequently, a conductive polymer layer of polypyrrole or the like is formed on the surface of the precoat layer by using an electropolymerization method. In this way, conductive polymer layer 4 made of a layered film of the precoat layer and the conductive polymer layer is formed on dielectric layer 3.

Step 4: Formation of Negative Electrode Draw Out Layer

Carbon layer 5a was formed by applying a carbon paste onto the surface of conductive polymer layer 4 so as to be in direct contact with conductive polymer layer 4. Next, silver paste layer 5b was formed by applying a silver paste onto carbon layer 5a. Negative electrode draw out layer 5 is composed of carbon layer 5a and silver paste layer 5b.

Step 5: Connection Between Positive Electrode Terminal and Negative Electrode Terminal First end part 7a of positive electrode terminal 7 is electrically and mechanically connected to second end part 2b of positive electrode lead 2 by welding or the like. Further, first end part 9a of negative electrode terminal 9 is electrically and mechanically connected onto negative electrode layer 6 by conductive adhesive 8. Positive electrode terminal 7 and negative electrode terminal 9 comprise a copper plate used as a core, which is nickel-palladium-gold plated. A thickness of the copper plate was 0.1 mm, and a thickness of a plated layer ranges about 0.3 μm to 2 μm. Since the linear expansion coefficients of plated positive electrode terminal 7 and negative electrode terminal 9 depend on the core of each terminal, the linear expansion coefficients of positive electrode terminal 7 and negative electrode terminal 9 are $1.62 \times 10^{-5}/°$ C. which are the same as the linear expansion coefficient of copper.

Step 6: Molding Step

Resin outer body 11 was formed by a transfer molding method by using a sealing agent containing an epoxy resin (base compound), an imidazole compound (curing agent) and silica particles as fillers in such a way that a part of positive electrode terminal 7 and a part of negative electrode terminal 9 are exposed. Specifically, a preheated sealing material was injected into a die and cured in the die. After resin outer body 11 was formed, the exposed portions of positive electrode terminal 7 and negative electrode terminal 9 were bent at a side surface of resin outer body 11 toward an under surface of resin outer body 11 to form portions of terminals 7b and 9b to be used for solder joint to a substrate.

The linear expansion coefficient of the resin outer body in the present exemplary embodiment was $1.7 \times 10^{-5}/°$ C.

Thus, solid electrolytic capacitor 20 of Example 1 was prepared.

Example 2

A solid electrolytic capacitor of Example 2 was prepared in the same manner as in Example 1 except for changing the linear expansion coefficient of the resin outer body to $2.1 \times 10^{-5}/°$ C. by adjusting a mixing amount of the silica particles serving as fillers in the step 6.

Comparative Example 1

A solid electrolytic capacitor of Comparative Example 1 was prepared in the same manner as in Example 1 except for changing the linear expansion coefficient of the resin outer body to $1.3 \times 10^{-5}/°$ C. by adjusting a mixing amount of the silica particles serving as fillers in the step 6.

Comparative Example 2

A solid electrolytic capacitor of Comparative Example 2 was prepared in the same manner as in Example 1 except for changing positive electrode lead 2 made of niobium to positive electrode lead 2 made of tantalum in the step 1.

Comparative Example 3

A solid electrolytic capacitor of Comparative Example 3 was prepared in the same manner as in Example 1 except for changing positive electrode lead 2 made of niobium to positive electrode lead 2 made of tantalum in the step 1, and changing the linear expansion coefficient of the resin outer body to $1.3 \times 10^{-5}/°$ C. by adjusting a mixing amount of the fillers in the step 6.

[Measurement of ESR]

The ESR (equivalent series resistance) was measured before and after the high-temperature load test on each of the solid electrolytic capacitors thus prepared. The high-temperature load test was performed at 125° C. in a state of applying a rated voltage for a prescribed time. The ESR was measured in the conditions of 100 kHz and 100 mV. In addition, the results of measurement are values obtained by dividing change rates in ESR measured before and after the high-temperature load test by an application time of a high-temperature load.

The results of measurement are shown in Table 1.

TABLE 1

| | Linear Expansion Coefficient of Positive Electrode Lead ($\times 10^{-5}/°$ C.) | Linear Expansion Coefficient of Positive Electrode Terminal and Negative Electrode Terminal ($\times 10^{-5}/°$ C.) | Linear Expansion Coefficient of Resin Outer Body ($\times 10^{-5}/°$ C.) | ESR (Equivalent Series Resistance) (μΩ/h) |
| --- | --- | --- | --- | --- |
| Example 1 | Niobium 0.73 | 1.62 | 1.7 | 15.6 |
| Example 2 | Niobium 0.73 | 1.62 | 2.1 | 16.3 |
| Comparative Example 1 | Niobium 0.73 | 1.62 | 1.3 | 27.4 |
| Comparative Example 2 | Tantalum 0.67 | 1.62 | 1.7 | 26.8 |
| Comparative Example 3 | Tantalum 0.67 | 1.62 | 1.3 | 17.5 |

From the above results, Examples 1 and 2, in which the linear expansion coefficient of the resin outer body is larger than all of the linear expansion coefficients of the positive electrode, the positive electrode lead, the positive electrode terminal and the negative electrode terminal, could suppress an increase in ESR after a high-temperature load compared with Comparative Example 1 in which the linear expansion coefficient of the resin outer body is smaller than the linear expansion coefficients of the positive electrode terminal and the negative electrode terminal.

Examples 1 and 2 could suppress an increase in ESR after a high-temperature load compared with Comparative Example 1, but Comparative Example 2 could not suppress an increase in ESR after a high-temperature load compared with Comparative Example 3. In Examples 1 and 2, since the positive electrode lead of niobium is embedded in the positive electrode composed of a porous sintered body of tantalum, the adhesion after the high-temperature load may be deteriorated in the vicinity of a joining portion of the positive electrode and the positive electrode lead. Accordingly, in Comparative Examples 2 and 3 in which there is not such a problem, it is thought that such the effect as in Examples 1 and 2 could not be found even when the linear expansion coefficient of the resin outer body is larger than all of the linear expansion coefficients of the positive electrode, the positive electrode lead, the positive electrode terminal and the negative electrode terminal.

What is claimed is:

1. A solid electrolytic capacitor comprising:
    a capacitor element including a positive electrode which contains tantalum as a principal component and is composed of a porous sintered body, a positive electrode lead which contains niobium as a principal component and has a first end part embedded in the positive electrode and a second end part extending from the positive electrode, a dielectric layer which is disposed on a surface of the positive electrode and a part of a surface of the positive electrode lead, and a negative electrode layer disposed on the dielectric layer;
    a positive electrode terminal electrically connected to the second end part of the positive electrode lead;
    a negative electrode terminal electrically connected to the negative electrode layer; and
    a resin outer body covering a surface of the capacitor element, a part of the positive electrode terminal and a part of the negative electrode terminal, the resin outer body containing a filler,
    wherein a linear expansion coefficient of the resin outer body is larger than any of linear expansion coefficients of the positive electrode, the positive electrode lead, the positive electrode terminal and the negative electrode terminal.

2. The solid electrolytic capacitor according to claim 1, wherein a difference between the linear expansion coefficient of the resin outer body and the largest linear expansion coefficient among the linear expansion coefficients of the positive electrode, the positive electrode lead, the positive electrode terminal, and the negative electrode terminal is $0.05 \times 10^{-5}/°$ C. or more.

3. The solid electrolytic capacitor according to claim 1, wherein the positive electrode terminal and the negative electrode terminal are made of copper or each of these terminals has a core made of copper, and the linear expansion coefficient of the resin outer body is within a range from $1.7 \times 10^{-5}/°$ C. to $3.0 \times 10^{-5}/°$ C.

4. The solid electrolytic capacitor according to claim 1, wherein the filler is made of silica, and the linear expansion coefficient of the resin outer body is within a range from $1.7 \times 10^{-5}/°$ C. to $3.0 \times 10^{-5}/°$ C.

* * * * *